United States Patent
Kerr

[19]

[11] Patent Number: 6,056,338
[45] Date of Patent: May 2, 2000

[54] LOCKABLE KITCHEN TONG

[75] Inventor: Helen Kerr, Toronto, Canada

[73] Assignee: Browne & Co., Ltd., Canada

[21] Appl. No.: 09/433,675

[22] Filed: Nov. 4, 1999

Related U.S. Application Data

[63] Continuation-in-part of application No. 09/210,261, Dec. 10, 1998, abandoned.

[51] Int. Cl.$^7$ .............................. A47G 21/10; A47J 43/28
[52] U.S. Cl. .............................. 294/16; 294/28; 294/99.2; 294/106
[58] Field of Search .................................. 294/3, 8.5, 11, 294/16, 28–31.1, 33, 99.2, 100, 106, 110.1, 115–117; 30/142, 147, 150, 322; D7/643, 683, 686

[56] References Cited

U.S. PATENT DOCUMENTS

| | | |
|---|---|---|
| 134,756 | 1/1873 | Marston . |
| D. 165,869 | 2/1952 | Reiner .......................................... D44/4 |
| 2,111,195 | 3/1938 | Saku ............................................... 7/1 |
| 2,532,406 | 12/1950 | Jernigan ..................................... 294/99 |
| 2,768,856 | 10/1956 | Wright ..................................... 294/99 |
| 2,864,645 | 12/1958 | Meldrum ................................. 294/106 |
| 3,358,586 | 12/1967 | Thorngren, Sr. .......................... 99/402 |
| 3,420,563 | 1/1969 | Witt ............................................. 294/16 |
| 4,728,139 | 3/1988 | Oretti ..................................... 294/99.2 |
| 5,199,756 | 4/1993 | Bartlett et al. ............................. 294/16 |
| 5,564,146 | 10/1996 | Luu .............................................. 7/170 |

OTHER PUBLICATIONS

Six photographs of AMCO Tong, No Date.

*Primary Examiner*—Johnny D. Cherry
*Attorney, Agent, or Firm*—Mark Kusner

[57] ABSTRACT

The invention provides tongs for manually grasping items having two elongate tong members pivotally joined together with a hinge pin. The tong members pivot between an open position and a closed position, each member having a forward grasping end, a hinged portion adjacent and projecting rearward of the hinge pin, and an inner channel extending forwardly and rearwardly from the hinge pin. A novel bow spring has two arms each sliding in the channels between a forward position engaging the channels forward of the hinge pin, and a rearward position engaging the channels in the hinged portion adjacent the hinge pin. The spring resiliently biases the tong members to the open position when the bow spring is in the forward position, and retains the tong members in the closed position when the bow spring is in the rearward position.

9 Claims, 1 Drawing Sheet

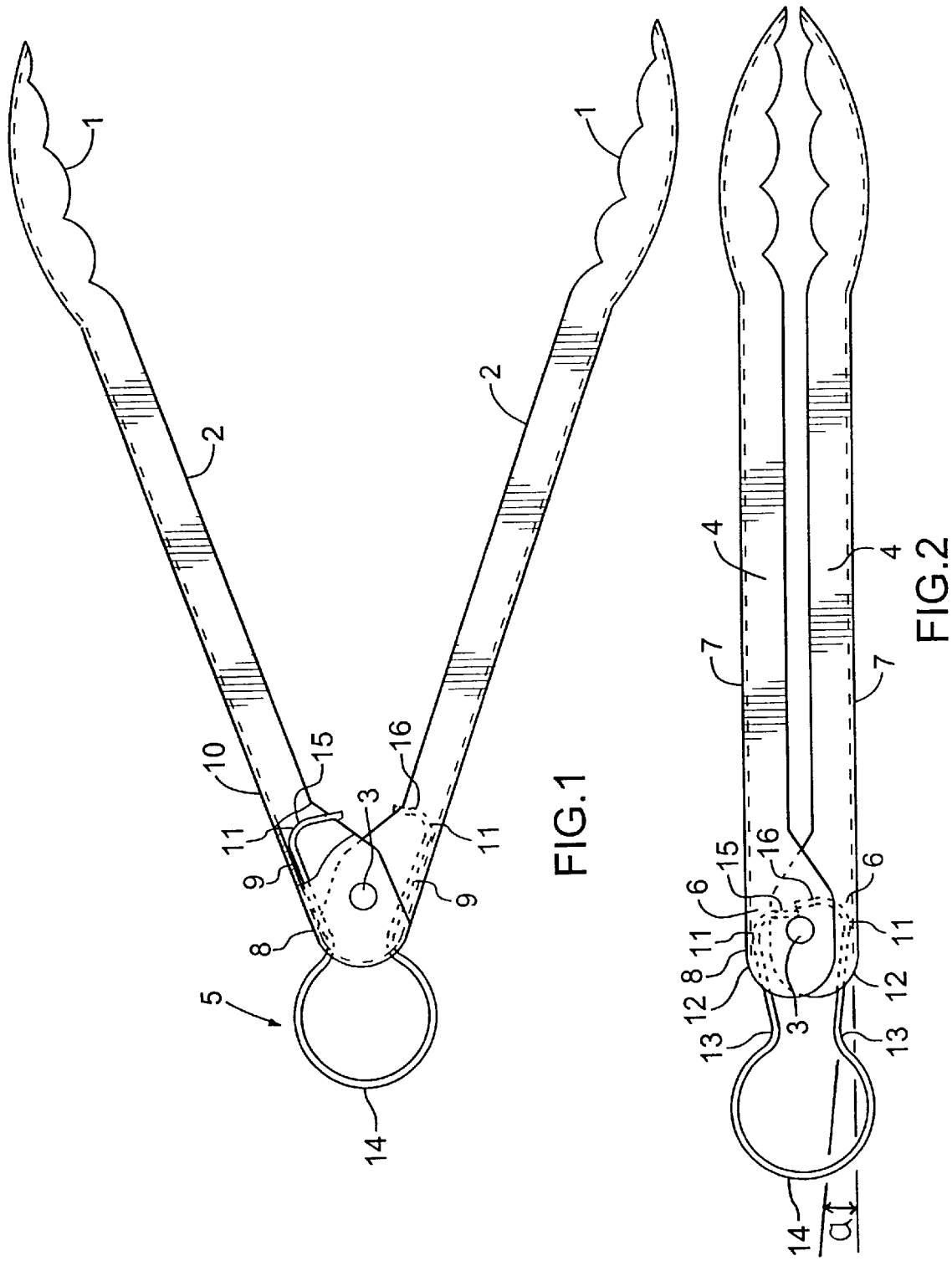

LOCKABLE KITCHEN TONG

This is a continuation-in-part of application Ser. No. 09/210,261 filed on Dec. 10, 1998, now abandoned.

TECHNICAL FIELD

The invention is directed to tongs for manually gripping items that has a novel bow spring that slides relative to the tong members to serve as a spring to bias the hinged tong members to an open position and to force the tong members together in a closed or folded position.

BACKGROUND OF THE ART

Tongs are a common tool used for grasping items manually, for example, where items are hot or inaccessible. Kitchen tongs are commonly used which include two elongate tong members pivotally joined together with a hinge pin. Various spring configurations are used in the prior art to bias the tong members to a normally open position, and various mechanical latches are used to hold the tongs in a closed position. The user exerts pressure manually by grasping the tong members forward of the hinge pin squeezing against the biasing force of the spring to close the tongs and releasing the grip to permit the tongs to open.

A number of challenges confront the manufacturers of such tongs, especially for kitchen use. Low cost, durability, simplicity and ease of cleaning are paramount. The spring mechanism and any latch mechanism to lock the tongs in a closed position must be of a very simple construction. Tongs are generally very inexpensive items and minimal labour and materials in manufacturing tongs is the goal of manufacturers. Complex locking or spring loading mechanisms are highly undesirable since they often provide crevices or ridges within which food and accompanying bacteria may accumulate resulting in a health hazard. Simple open structures are preferred to permit adequate cleaning and disinfecting with conventional dishwashing equipment.

Rugged durable construction is also highly desirable since components that break or fall apart may unintentionally fall into the food being prepared. In addition, it is highly desirable to have tongs which can be operated with one hand to simplify repeated use by professional or amateur cooks. Professional cooks work at a rapid pace and demand tools that are simple to use, and can be operated single-handed. Tongs that require too much attention to operate or that cannot stand up under rough treatment will be quickly discarded by a professional cook.

Many of the conventional tongs available include a separate locking device which must be operated with both hands by the user. A significant disadvantage of many prior art locking devices is that the locking device engages unexpectedly during use and locks the tongs in a closed position when that result was not intended by the user.

Examples of the prior art include U.S. Pat. No. 5,199,756 to Bartlett et al. Bartlett provides a conventional pair of tong members hinged at a pivot pin with a bow spring wrapped about the pivot pin biasing the tong members to an open position. A generally rectangular slotted tab is provided as a locking mechanism slidably disposed with the slot engaging the pivot pin. The outer rectangular edges of the tab engage and disengage a rearward portion of the tong members applying a levering or wedging force to close the tong members against the biasing pressure of the bow spring.

A disadvantage of this Bartlett device is that a separate locking device is required which increases manufacturing costs and provides additional areas within which food and bacteria accumulate. The sliding plate serves to lock the tongs in a closed position but also increases the cost of manufacturing and assembly while providing additional hidden areas within which food and bacteria can accumulate.

A second example is provided in U.S. Pat. No. 2,864,645 to Meldrum, which provides a similar pair of tong members hinged together at a pivot pin. A locking device is provided in the form of a sliding bolt which rides in a slotted channel in the tong members and interlocks with a locking dog adjacent to the pivot pin. Disadvantages of this system are the risk of unintentional locking during normal use, unnecessarily complex manufacturing of additional components required for the locking mechanism and the presence of crevices or ridges within which food or bacteria can accumulate.

U.S. Pat. Nos. 2,768,856 to Wright and 2,532,406 to Jernigan and design Pat. No. 165,869 to Reiner, all include a locking mechanism comprising a sliding ring that slides on the outside of the hinged tong members to lock them in a closed position. The external ring used as a locking device, however, has an aggravating tendency when the user squeezes the tong members together to close about an item to be grasped, to engage the sliding ring on the outside of the tong members unintentionally holding the tong members in a locked position. This is a especially annoying for professional cooks when used repeatedly and in circumstances where speed is essential. Invariably, the professional user will simply remove the locking outside ring to avoid aggravation.

Therefore, it is desirable to provide a set of tongs which is extremely simple and inexpensive to manufacture.

It is also desirable to provide a set of tongs which is easily cleaned with existing kitchen cleaning equipment.

It is also desirable to provide a set of tongs which can be operated with a single hand freeing the user from using both hands to engage and disengage the locking mechanism. It is also desirable to provide a locking mechanism for tongs which does not engage unintentionally and unexpectedly.

DISCLOSURE OF THE INVENTION

The invention provides tongs for manually grasping items having two elongate tong members pivotally joined together with a hinge pin. The tong members pivot between an open position and a closed position, each member having a forward portion, a hinged portion adjacent and projecting rearward of the hinge pin, and an inner channel extending forwardly and rearwardly from the hinge pin. A novel bow spring has two arms each sliding in the channels between a forward position engaging the channels of the tong members forward of the hinge pin, and a rearward position engaging the channels in the hinged portion adjacent to or rearward of the hinge pin. The spring resiliently biases the tong members to the open position when the bow spring is in the forward position, and retains the tong members in the closed position when the bow spring is in the rearward position.

The invention provides a simple set of tongs which includes a bow spring that functions as a spring to resiliently open the tongs as well as means to retain the tong members in closed position.

Compared to the prior art therefore, the invention removes the necessity of having a separate moveable locking member. A single spring in the invention serves to bias the tong arms open, and to lock the tongs in a closed position. The prior art uses separate springs and lock components to serve the same functions. Since such tongs are inexpensive mass produced items, the addition of a single component such as a locking tab in U.S. Pat. No. 5,199,756 to Bartlett et al. or a single locking bolt as in U.S. Pat. No. 2,864,645 to Meldrum or a locking external ring as in U.S. Design Pat. No. 165,869 to Reiner, will significantly effect the cost of material and labour during manufacture and assembly.

As well, it can be readily appreciated that the reduction in component parts removes surfaces and crevices in which food and bacteria may accumulate. The invention provides an open spring which is accessible to the spray of conventional dishwashing equipment or other commonly used cleaning devices.

The invention also provides a locking mechanism which can be activated or deactivated single handedly by the user. To move the sliding bow spring from the open to closed position, the user need only hang the tongs up by the ring of the bow spring on a wall hook. To move the tongs from the closed position to the open position, these need only push the ring of the bow spring into a hard surface, or apply slight finger prying pressure between the tongs to snap them open.

Of significant advantage is the control over the locking of the spring mechanism. In the open position, a recess or abutment between the ring and the arms of the bow spring retains the rear edge of the tong members, preventing the unintentional locking of the tongs together in the closed position. Friction between the contacting points of the spring and the inner channels of the tong members prevents the bow spring from moving under gravity for example into the closed position. This is a significant advantage over the prior art which generally has a tendency of moving unintentionally from the unlocked to the locked position during use.

Further details of the invention and its advantages will be apparent from the detailed description and drawings included below.

BRIEF DESCRIPTION OF THE DRAWINGS

In order that the invention may be readily understood, one preferred embodiment of the invention will be described by way of example, with reference to the accompanying drawings wherein:

FIG. 1 is a side view of the tongs with two elongate tong members joined together with a hinge pin showing the bow spring slidably disposed forwardly in channels formed in the hinged portion.

FIG. 2 shows a like side view where the bow spring had been pulled rearwardly into the closed position, and showing the function of the tabs on the ends of the bow spring arms to hold the bow spring in place and allow the tongs to be suspended from the pivot pin with a ring portion of the bow spring.

DETAILED DESCRIPTION OF PREFERRED EMBODIMENTS

The invention provides a tong device which is deceptively simple on initial examination, however, as described below, there are several inventive features inherent in the bow spring design which represent a significant advantage over the prior art.

As is conventional, tongs are for manually grasping items with the grasping end 1 of the elongate tong members 2 and are pivotally joined together with a hinge pin 3. In the embodiment shown, the tong members are formed of sheet metal, preferably stainless steel bent into a U-shaped channel with grasping ends 1 formed into an open spoon shape. In the area of the hinge pin 3, the upstanding flanges 4 are increased in height to overlap and provide a hinge structure for the pin 3. The U-shaped tong members 2 each provide a channel within which the bow spring 5 can slide as evident in a comparison between FIGS. 1 and 2. In the embodiment shown, a rectangular shaped channel 6 is defined between the upstanding flanges 4 and the web 7 of the tong members 2.

Each tong member 2 has a forward portion defined forwardly of the hinged pin 3 and a hinged portion 8 immediately adjacent and projecting rearward of the hinge pin 3. The inner channel 6 extends both forwardly and rearwardly from the hinge pin 3 providing a means to laterally contain the movement of the sliding bow spring 5.

It will be apparent that although the embodiment illustrated shows a rectangular channel formed in bent sheet metal tong members 2, the invention is applicable to any type of tong member 2 in which such a channel 6 of shape matching the spring 5 is formed. For example, the tong members 2 may be cast metal or molded plastic and the bow spring 5, rather than being a flat plate, may comprise a bent cylindrical rod with matching channel 6.

The bow spring 5 has two arms 9 each slidably disposed in one of the channels 6. In the open position shown in FIG. 1, it can be seen that the bow spring 5 has been preformed to ensure that the bow spring 5, when in the forward position shown in FIG. 1, engages the channel 6 and the forward portion 10 of the tong members 2 a distance forward of the hinge pin 3 in order to exert a sufficient leverage force on the, tong members 2. The extent of opening of the tongs is restricted when the rearward curved ends of the flanges 4 engage the web 7 of the opposite tong member 2.

The arms 9 of the bow spring 5 have been preformed such that a contact point of the arm 9 is adjacent the bent forward end 11. The angular orientation between the arms 9 in the forward open position is somewhat less than the angular orientation between the webs 7 of the open tong members 2. The pre-forming of the spring 5 ensures that the spring 5 exerts a biasing force close to the bent ends 11 by applying leverage to the tong members 2 about the hinge pin 3.

In the rearward position shown in FIG. 2, the two arms 9 engage the channels 6 in the hinged portion 8 adjacent to the hinge pin 3. The outwardly resilient force exerted by the bent ends 11 of the spring 5 is directed adjacent to the hinge pin 3 such that the force moment resulting from the spring force and extremely short lever arm is insufficient to open to the tong members 2. It will be apparent, however, that the spring 5 can be configured such that the bent end 11 exerts a force rearward of the hinge pin 3. In this case, the force exerted by the bent end 11 rearward of the hinge pin 3 (configuration not shown in the drawings) will result in a force moment which will resiliently urge the tong members 2 to a closed position. In the embodiment shown in FIG. 2, however, the location of the bent end 11 is relatively close to and adjacent the hinge pin 3, but is sufficient to retain the tong members 2 in the closed position.

For example, if the spring 5 were to be completely removed, the tong members 2 would be in equilibrium at rest in closed position shown in FIG. 2. By including the spring 5 in the position shown in FIG. 2, the force moment exerted by the spring 5 either is directed transversely through the hinge pin 3, resulting in no force moment or is of insufficient magnitude to overcome the frictional forces between the bent end 11 and the internal face of the web 7. As a result, even if a small degree of resilient force is applied tending to open the tong members 2, the force moment is insufficient to overcome the friction between the spring 5 and the tong members 2. If desired, the bow spring 5 can be configured such than an active moment is applied to close the tong members 2 by positioning the bent end 11 rearwardly of the hinge pin 3.

The bow spring 5 includes forward and rearward stop means for limiting the forward and rearward sliding travel of the bow spring 5 relative to the tong members 2. This can be seen from FIG. 1, where the forward sliding of the bow spring 2 is limited by the engagement between the rearward edge 12 of each tong member 2 with an abutment shoulder 13 on the bow spring rearward of each bow spring arm 9. In the embodiment shown, the abutment 13 is formed by the ring portion 14 where it is bent at the intersection with the bow spring arms 9. The ring portion 14 being of larger diameter than the distance between the rearward edges 12 in the closed position, effectively prevents forward movement of the bow spring 5 in the assembled tongs. The ring portion 14 also conveniently provides means to suspend the tongs on a hook, for example, or for inserting a finger to pull the bow spring 5 to the closed position shown in FIG. 2.

As indicated in FIG. 2, the rearward sliding of the bow spring 5 is limited by an abutment tab 15 which engages the hinge pin 3 when the bow spring 5 is in the rearward closed position. In the embodiment shown, a second tab 16 is provided on the other bow spring arm 9 to prevent the bow spring 5 from being removed inadvertently. To enhance the resistance to withdrawal of the bow spring 5, the tabs 15 and 16 overlap each other when in the rearward closed position as indicated in FIG. 2.

Of advantage, as indicated in FIG. 2, the arms 9 of the bow spring 5 are disposed at a small acute angle "a" relative to the channels 6 when in the closed rearward position. The spring 5 cooperates with the tong members 2 to snap rapidly open when the user pries the tong members 2 apart.

In operation, when a user picks up the tongs in the closed position, the user may slide the bow spring 5 to the open position shown in FIG. 1 by pushing the ring portion 14 against a solid object. Opening of the tongs can be easily done with one hand knocking the spring ring 14 on a countertop. In contrast, the prior art requires the user to drop everything and use two hands to open the tongs.

The tongs of the invention may also be opened with one hand where the user grasps the closed tongs with one hand and inserts fingers between the closed adjacent flanges 4 to pry the tong members 2 apart slightly. When the tong members 2 are slightly apart, the rearward edge 12 of the tong members 2 will slightly rotate and compress the flexible arms 9 of the bow spring together. Due to the acute angle "a" at which the arms 9 are disposed in the closed position of FIG. 2, and smooth spring arms 9, this slight depression or flexing of the spring arms 9 together will result in rapid forward sliding of the bow spring 5 along the rearward edges 12 of the tong members 2.

In effect, a slight prying apart of the tong members 2 results in a snap action forward movement of the bow spring 5 from the closed position in FIG. 2 to the open position in FIG. 1. The forward movement is restricted by the engagement of the rearward edge 12 with the abutment shoulder 13 of the ring portion 14 of the bow spring 5. Of course, this snap opening feature can be modified or eliminated by modifying the coefficient of friction between the spring arms 9 and the rearward edges 12.

The angular orientation between the arms 9 of the bow spring 5 in the open position shown in FIG. 1 is also of advantage as follows. In the embodiment shown, the bow spring 5 is a bent flat strip of stainless steel spring metal. As the ring portion 14 of the bow spring 5 is pulled rearwardly (or to the left as drawn in the Figures), the rearward edges 12 of the open tong members 2 are gradually resiliently forced apart to pivot about the hinge pin 3 by the angular orientation of the spring arms 9. This can be seen in a comparison between FIGS. 1 and 2. The lateral distance between the rearward edges 12 in the FIG. 2 closed position is larger than the distance in the open position shown in FIG. 1. The wedging action of the bow spring 5 as it is withdrawn rearwardly urges the opening of this distance between the rearward edges 12 and serves to rotate the tong members 2 from the open position to the closed position. Once the tong members 2 have been rotated by the wedging action to the closed position, the laterally outward spring force exerted by the bent ends 11 of the bow spring 5 serves to retain the tong members 2 in the closed position. As mentioned above, this retaining function is either provided by ensuring that the bent ends 11 are positioned rearwardly of the hinge pin 3, or by ensuring that the friction force between the bent end 11 and the web 7 is sufficient to counteract any minor resultant moment which would tend to open the tong members 2.

The invention improves over the prior art in permitting the tongs to be opened with one hand, reducing parts, simplifying cleaning and manufacture.

Although the above description and accompanying drawings relate to a specific preferred embodiment as presently contemplated by the inventor, it will be understood that the invention in its broad aspect includes mechanical and functional equivalents of the elements described and illustrated.

The embodiments of the invention in which an exclusive property or privilege is claimed are defined as follows:

1. Tongs for manually grasping items, comprising:
   two elongate tong members pivotally joined together with a hinge pin, the tong members pivoting between an open position and a closed position, each tong member having a forward portion; a hinged portion adjacent and projecting rearward of the hinge pin; and an inner channel extending forwardly and rearwardly from the hinge pin; and
   a bow spring having two arms each slidably disposed in one said channel between a forward position engaging the channels of the tong members forward of the hinge pin, and a rearward position engaging the channels in the hinged portion adjacent the hinge pin, the spring resiliently retaining the tong members in the open position when the bow spring is in the forward position, and biasing the tong members to the closed position when the bow spring is in the rearward position.

2. Tongs according to claim 1 including forward and rearward stop means for limiting the forward and rearward sliding travel of the bow spring relative to the tong members.

3. Tongs according to claim 2 wherein the forward stop means comprise an abutment shoulder on the bow spring rearward of each bow spring arm engaging a rearward edge of each tong member when the bow spring is in the forward open position.

4. Tongs according to claim 2 wherein the rearward stop means comprise at least one abutment tab on a forward portion of a bow spring arm, the tab engaging the hinge pin when the bow spring is in the rearward closed position.

5. Tongs according to claim 4 comprising two tabs, one on each bow spring arm, and wherein the tabs overlap each other when in the rearward closed position.

6. Tongs according to claim 1 wherein a rearward portion of the bow spring comprises an open loop.

7. Tongs according to claim 1 wherein the arms of the bow spring are disposed at an acute angle relative to the cheeks when in the closed rearward position.

8. Tongs according to claim 1 wherein the bow spring comprises a bent flat strip of spring metal.

9. Tongs according to claim 8 wherein the metal is stainless spring steel.

* * * * *